United States Patent
Cope et al.

(10) Patent No.: US 8,634,826 B1
(45) Date of Patent: Jan. 21, 2014

(54) USE OF IN-VEHICLE FEMTOCELL AS BASIS TO LIMIT OPERATION OF IN-VEHICLE WIRELESS COMMUNICATION DEVICE

(75) Inventors: Warren B. Cope, Olathe, KS (US); Pallavur A. Sankaranarayanan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 504 days.

(21) Appl. No.: 12/732,439

(22) Filed: Mar. 26, 2010

(51) Int. Cl.
*H04W 12/06* (2009.01)

(52) U.S. Cl.
USPC .............. 455/426.1; 455/562.1; 455/553.1; 375/260; 370/328; 370/331

(58) Field of Classification Search
USPC .............. 455/418, 435.1, 26.1, 41.1–41.2, 455/569.1–569.2, 592.2, 426.1, 562.1, 455/553.1; 375/260; 370/328, 331
See application file for complete search history.

(56) References Cited

U.S. PATENT DOCUMENTS

| | | | |
|---|---|---|---|
| 6,108,532 A | 8/2000 | Matsuda et al. | |
| 6,256,558 B1 | 7/2001 | Sugiura et al. | |
| 6,353,778 B1 | 3/2002 | Brown | |
| 6,490,450 B1 | 12/2002 | Batni et al. | |
| 6,640,115 B1 | 10/2003 | Fujimoto et al. | |
| 6,690,940 B1 | 2/2004 | Brown et al. | |
| 7,142,666 B1 | 11/2006 | Bates et al. | |
| 7,181,229 B2 | 2/2007 | Singh et al. | |
| 8,355,713 B1 | 1/2013 | Oh et al. | |
| 2001/0006886 A1 | 7/2001 | Suzuki | |
| 2003/0032460 A1* | 2/2003 | Cannon et al. ................ | 455/569 |
| 2003/0096621 A1 | 5/2003 | Jana et al. | |
| 2003/0109246 A1 | 6/2003 | Shimizu et al. | |
| 2005/0026619 A1* | 2/2005 | Jha ................................ | 455/441 |
| 2005/0255874 A1* | 11/2005 | Stewart-Baxter et al. | . 455/550.1 |
| 2005/0272431 A1 | 12/2005 | Katori et al. | |
| 2005/0281237 A1* | 12/2005 | Heinonen et al. ............ | 370/338 |
| 2006/0099940 A1 | 5/2006 | Pfleging et al. | |

(Continued)

FOREIGN PATENT DOCUMENTS

| | | |
|---|---|---|
| EP | 1589727 A1 | 10/2005 |
| GB | 2420059 | 10/2006 |
| GB | 2420059 B | 11/2006 |

OTHER PUBLICATIONS

Halfbakery, "Cell Phone Use Control," www.halfbakery.com/idea/Cell_20Phone_20Use_20Control, May 25, 2010.

(Continued)

*Primary Examiner* — Mahendra Patel

(57) ABSTRACT

A method and corresponding system for use of a femtocell in a vehicle (an "in-vehicle femtocell") to help limit operation of a wireless communication device (WCD) positioned in the vehicle. In one implementation, registration (or registration attempts) of one or more WCDs with an in-vehicle femtocell may be used as a basis to trigger limitations on certain WCD functions in a vehicle, such as to prevent a WCD from providing text-messaging service for instance. In another implementation, a WCD may receive a signal from an in-vehicle femtocell and in response to the signal, the WCD may register with the femtocell to be served with wireless communication service by the femtocell. In addition to registering with the femtocell, the WCD may limit certain of its own functions while it is in the vehicle and being served with wireless communication service by the femtocell.

15 Claims, 7 Drawing Sheets

(56) References Cited

U.S. PATENT DOCUMENTS

| | | | |
|---|---|---|---|
| 2007/0155421 A1* | 7/2007 | Alberth et al. | 455/553.1 |
| 2009/0002147 A1 | 1/2009 | Bloebaum et al. | |
| 2009/0075593 A1 | 3/2009 | Demirbasa et al. | |
| 2009/0098855 A1* | 4/2009 | Fernandez et al. | 455/410 |
| 2009/0111422 A1 | 4/2009 | Bremer et al. | |
| 2010/0035588 A1* | 2/2010 | Adler et al. | 455/414.1 |
| 2010/0234071 A1* | 9/2010 | Shabtay et al. | 455/562.1 |
| 2010/0311416 A1* | 12/2010 | Abichandani et al. | 455/426.1 |
| 2011/0136509 A1 | 6/2011 | Osann | |
| 2011/0137520 A1* | 6/2011 | Rector et al. | 701/36 |
| 2011/0244870 A1 | 10/2011 | Lee | |
| 2013/0084847 A1 | 4/2013 | Tibbitts et al. | |

OTHER PUBLICATIONS

Halfbakery, "Cell Phone Block While Driving," www.halfbakery.com/idea/Cell_20Phone_20Block_20Driving, May 25, 2010.

Jennifer Johnson, "TXTBlocker Lets Users Disable Texting & Other Features While Driving," www.hothardware.com/News/TXTBlocker-Lets-Users-Disable-Texting—Other-Features-While-Driving/, Oct. 3, 2009.

Textecution—Premium Mobile Device Safety Application, "Frequently Asked Questions," www.textecution.com/faqs.php, May 25, 2010.

ZoomSafer, "ZoomSafer eliminates the temptation to text while driving and keeps you connected via hands-free services," www.zoomsafer.com/personal.aspx, Jan. 4, 2010.

* cited by examiner

USE OF IN-VEHICLE FEMTOCELL AS BASIS TO LIMIT OPERATION OF IN-VEHICLE WIRELESS COMMUNICATION DEVICE

BACKGROUND

1. Cellular Wireless Networks

Cellular wireless is an increasingly popular means of personal communication in the modern world. People are using cellular wireless networks for the exchange of voice and data over such devices as cellular telephones, personal digital assistants (PDAs), cellular modems, and other wireless communication devices (WCDs).

In a typical cellular wireless communication system, an area is divided into cells and cell sectors, each defined by a radiation pattern (on a particular frequency) from a respective base station or "base transceiver station." Each base station is then typically connected with core network equipment that functions to provide connectivity with a transport network such as the public switched telephone network (PSTN) or the Internet for instance, and that may function to control base station operation and handoff of served client devices from one base station to another. Conveniently with this arrangement, a cellular phone or other WCD that is positioned within the coverage area of a given sector can communicate over an air interface with the base station and in turn via the core network equipment with entities on the transport network.

WCDs and base stations generally communicate with each other over a radio frequency (RF) air interface according to a defined air interface protocol, examples of which include CDMA, iDEN, WiMAX, TDMA, AMPS, GSM, GPRS, UMTS, EDGE, LTE, WI-FI, BLUETOOTH, and others now known or later developed. Such air interface communication typically occurs on a frequency known as a "carrier" (which may actually be a pair of frequencies, one for communications from the base station to the WCD, and another for communication from the WCD to the base station). On such a carrier, the base station may emit a pilot signal, which is a control signal that a WCD may detect as an indication of base station coverage. In particular, as the WCD moves into the coverage of a base station and is operating on the base station's carrier, the WCD may detect the base station's pilot signal. In response, the WCD may then hand off to operate in the indicated coverage area.

A wireless service provider typically operates numerous base stations in a given geographic region, to provide robust air interface coverage as WCDs move from one location to another. These cellular base stations are usually not associated with any subscriber or small group of subscribers in particular; rather, they are usually placed in publicly-accessible locations designed so that their coverage blankets cities, rural areas, etc. to be used by the service provider's customers generally. As such, these types of base stations are generally known as "macro base stations," and the network that they collectively form, or to which they belong, is generally known as a "macro network."

2. Femtocells

To address gaps in macro-network coverage (e.g., poor in-building coverage) and for other reasons, macro-network providers may offer their subscribers private base station devices known as "femtocells," (also sometimes referred to as access point base stations, picocells, ubicells, microcells, or femto-, pico-, ubi-, or micro-base stations or base transceiver stations), which are essentially small, low-power, low-capacity, and low-cost versions of a macro base station. Femtocells may be approximately the size of a desktop phone or WiFi access point. As a general matter, if a user, in addition to having cellular wireless service (which may include data service) for their WCDs, also has high-speed ("broadband") Internet access through another communication channel, a femtocell may communicate with the user's broadband router and may establish a virtual private network (VPN) connection via the Internet with the wireless service provider's core network (e.g., with a femtocell controller on the wireless service provider's network).

The femtocell may include a wireless communication interface that is compatible with the user's WCDs and that is arranged to serve the WCD in much the same way that a macro base station does, providing a pilot signal and so forth. With a femtocell positioned in a location where macro network coverage may be poor or unavailable, the user's WCD can thus be served by the femtocell in much the same way that the WCD would be served by a macro base station when within coverage of the macro network.

To avoid interference with macro network communication, a femtocell may operate on a different carrier than that used by macro base stations. Further, to facilitate handoff of WCDs from the macro network to a femtocell, the femtocell may emit a pilot "beacon" on the carrier frequency of the nearby macro network. The pilot beacon may include administrative messages and parameters that WCDs can use to connect with the femtocell and may thus serve to inform a WCD that the WCD may begin scanning for coverage on the carrier of the femtocell. Thus, when a WCD is operating in the macro network and approaches the coverage of a femtocell, the WCD may detect the femtocell's pilot beacon and responsively begin scanning the femtocell's carrier in search of a pilot signal to facilitate handoff to the femtocell.

A typical femtocell also includes a Global Positioning System (GPS) receiver for use in receiving and decoding GPS satellite signals. GPS signals may be used in a well known manner to determine the location of the femtocell, and the GPS-determined location of the femtocell may be used as a basis to authorize operation of the femtocell. In particular, upon startup, the femtocell may report its location via the broadband connection to the wireless service provider's core network, and an entity on the wireless service provider's network may determine whether the femtocell is allowed to operate at that location. If so, the entity may allow the femtocell to operate. Or if not, the entity may block operation of the femtocell.

Overview

As cellular wireless has grown in popularity, the use of WCDs (e.g., cellular phones) in vehicles has become common practice. Yet the use of WCDs in vehicles raises certain issues. Therefore, it would be beneficial to limit the use of WCDs in vehicles, especially use by persons operating vehicles.

Disclosed herein is a method and corresponding system for use of a femtocell in a vehicle (an "in-vehicle femtocell") to help limit operation of a WCD positioned in the vehicle. As disclosed, a femtocell will be provided for use in a vehicle, to serve WCDs in the vehicle with wireless communication service. Such an in-vehicle femtocell will be equipped to engage in wireless backhaul communication with a wireless carrier's core network, so that a WCD positioned in the vehicle can engage in wireless communication via the in-vehicle femtocell and can thereby communicate on one or more transport networks to which the core network provides connectivity.

In one implementation of the disclosed method, registration (or registration attempts) of one or more WCDs with an in-vehicle femtocell may be used as a basis to trigger limitations on certain WCD functions in a vehicle, such as to prevent a WCD from providing text-messaging service for instance. In this implementation, the method may be carried out by a network entity such as a network server. Alternatively, the femtocell may carry out the method.

In another implementation of the disclosed method, a WCD itself may carry out the method. Accordingly, the WCD may receive a signal from a femtocell that is located in a vehicle and in response to the signal the WCD may register with the femtocell to be served with wireless communication service by the femtocell. In addition to registering with the femtocell, the WCD may limit certain of its functions while it is in the vehicle and being served with wireless communication service by the femtocell. For instance, the WCD may prevent itself from providing voice communications service if it is not in a hands-free mode.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION

1. Exemplary Architecture a. Exemplary Network

Figure 1:
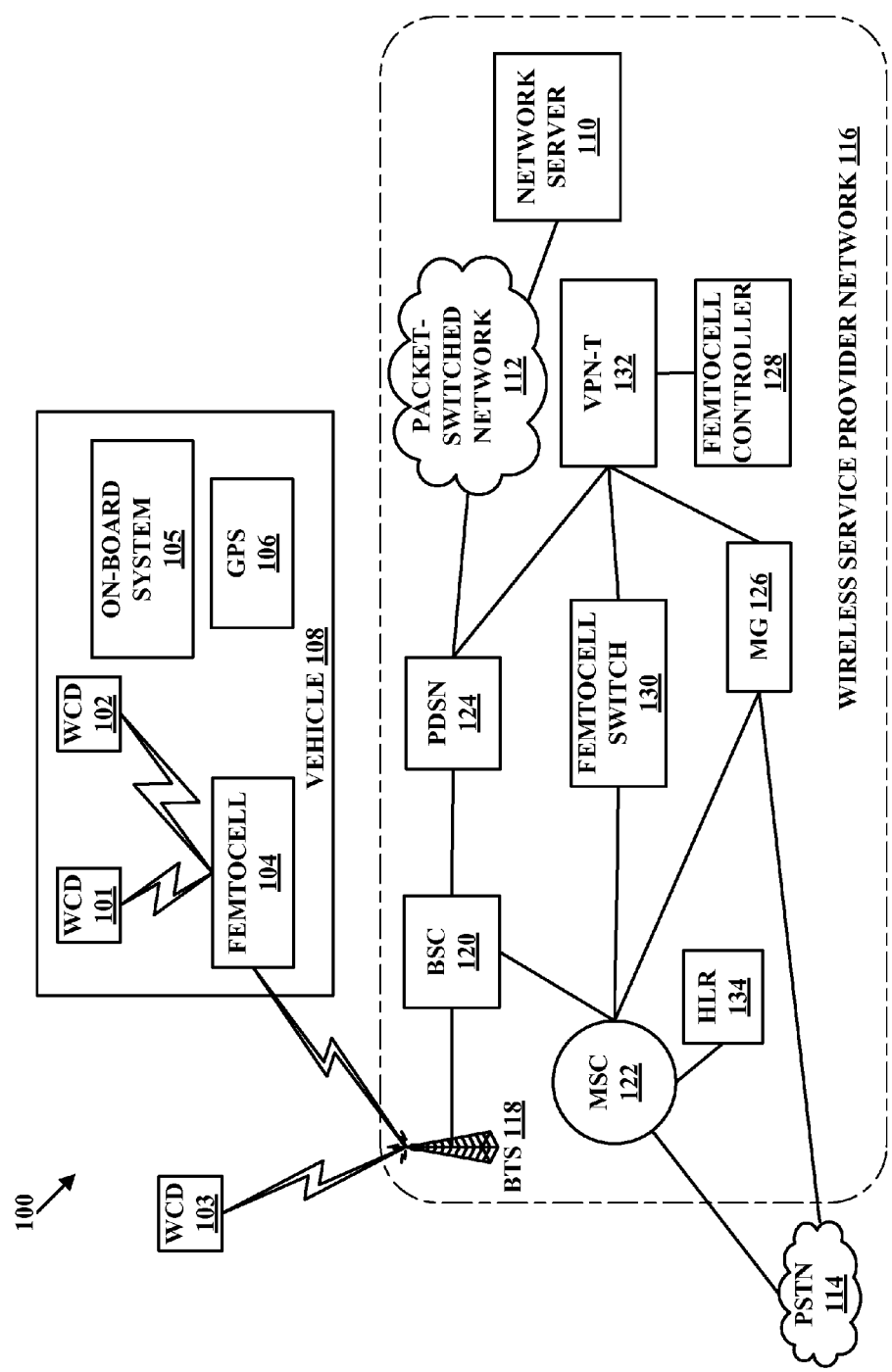
FIG. 1 is a simplified block diagram of an exemplary communication network.

FIG. 1 is a simplified block diagram of a system in which the above-mentioned method can be implemented. It should be understood, however, that this and other block diagrams and flow charts are meant merely as examples and are not intended to be limiting, particularly since various protocols may use different arrangements. For instance, various elements and functions can be integrated together, split and distributed, replicated, repositioned, eliminated, re-ordered, renamed, or otherwise modified. Further, it should be understood that functions described as being carried out by a given network element can be carried out by a processor executing program instructions and/or by any combination of hardware, firmware, and/or software.

As shown in FIG. 1, an exemplary system 100 includes two representative wireless communication devices (WCDs) 101, 102, a femtocell 104, an on-board system 105, and a GPS receiver 106, all located in a vehicle 108. System 100 further includes a public switched telephone network (PSTN) 114, a wireless service provider network (WSPN) 116, and a representative WCD 103 in direct communication with the WSPN 116.

As disclosed herein, "a vehicle" includes any means of carrying or transporting a WCD user and may encompass a car, truck, boat, aircraft, or other vehicle. In addition, the phrase "in a vehicle" is not meant to exclude on a vehicle or attached to a vehicle. For example, "wherein the femtocell is in a vehicle" may refer to the femtocell being located on the roof of a vehicle. In another example, "wherein the femtocell is in a vehicle" may refer to the femtocell being attached to the undercarriage of a vehicle.

WSPN 116 includes a network server 110, a packet-switched network 112, a base transceiver station (BTS) 118, a base station controller (BSC) 120, a mobile switching center (MSC) 122, a packet data serving node (PDSN) 124, a media gateway (MG) 126, a femtocell controller 128, a femtocell switch 130, a VPN terminator (VPN-T) 132, and a home location register (HLR) 134. In other embodiments, elements and/or functions may be included such as additional (or fewer) WCDs in communication with femtocell 104 and/or additional (or fewer) entities in communication with BTS 118. In this arrangement, BTS 118 radiates to define a radio frequency (RF) air interface through which BTS 118 may communicate with served WCDs and/or served femtocells, such as representative WCD 103 and representative femtocell 104. This communication may operate in accordance with any agreed air interface protocol, examples of which include those noted above. In addition, femtocell 104 also radiates to define an RF air interface through which femtocell 104 may communicate with served WCDs, such as representative WCDs 101, 102. This communication may also operate in accordance with any agreed air interface protocol, examples of which include those noted above.

In example operation, BSC 120 controls BTS 118 and is coupled with MSC 122, which provides connectivity with PSTN 114 so that WCD 103 served by BTS 118 can communicate with remote entities on PSTN 114. Further, BSC 120 is coupled with PDSN 124 or other gateway, which provides packet data connectivity with packet-switched network 112, so that WCD 103 served by BTS 118 can communicate with remote entities on packet-switched network 112, such as network server 110. Similarly, femtocell 104 is served by BTS 118 and is provided packet data connectivity, via BSC 120 and PDSN 124, so as to communicate, via VPN-T 32, with femtocell controller 128 and to provide a packet data path, via MG 126, to PSTN 114. Thus, WCDs 101, 102 served by femtocell 104 can communicate with remote entities on PSTN 114. Additionally, WCDs 101, 102 served by femtocell 104 can communicate, via BSC 120 and PDSN 124, with remote entities on packet-switched network 112.

To provide wireless communication service to a WCD, such as representative WCD 102, femtocell 104 may broadcast a signal, such as a pilot signal, to alert WCD 102 that it is within the coverage area of femtocell 104. The pilot signal may include messages and parameters that WCD 102 may use to initially connect with femtocell 104 or to facilitate handoff from a macro-network carrier to the femtocell's carrier, among other possibilities. The messages and parameters may inform WCD 102 of the femtocell's carrier, and WCD 102 may subsequently transmit a registration request to femtocell 104 on the femtocell's carrier. To facilitate WCD 102 registering with femtocell 104, the femtocell's pilot signal may have greater signal strength than that of BTS 118. Accordingly, WCD 102 may register to be served with wireless communication service by femtocell 104 as opposed to BTS 118. In addition, or alternatively, WCD 102 may include a preferred roaming list (PRL) or other logic that instructs WCD 102 to register to be served with wireless communication service by femtocell 104 even if the signal strength of BTS 118 is greater than that of femtocell 104.

In response to receiving the registration request from WCD 102, femtocell 104 may register WCD 102 and may begin providing WCD 102 with wireless communication service on the femtocell's carrier. Additionally or alternatively, femtocell 104 may forward the registration request to WSPN 116 to register WCD 102. Once WCD 102 is registered, femtocell 104 may begin providing WCD 102 with wireless communication service on the femtocell's carrier. The service provided to WCD 102 may be voice service, data service, or some combination thereof. As mentioned above, by providing WCD 102 with access to WSPN 116, femtocell 104 may enable WCD 102 to communicate with remote entities on PSTN 114 and packet-switched network 112.

b. Exemplary WCD

Figure 2:
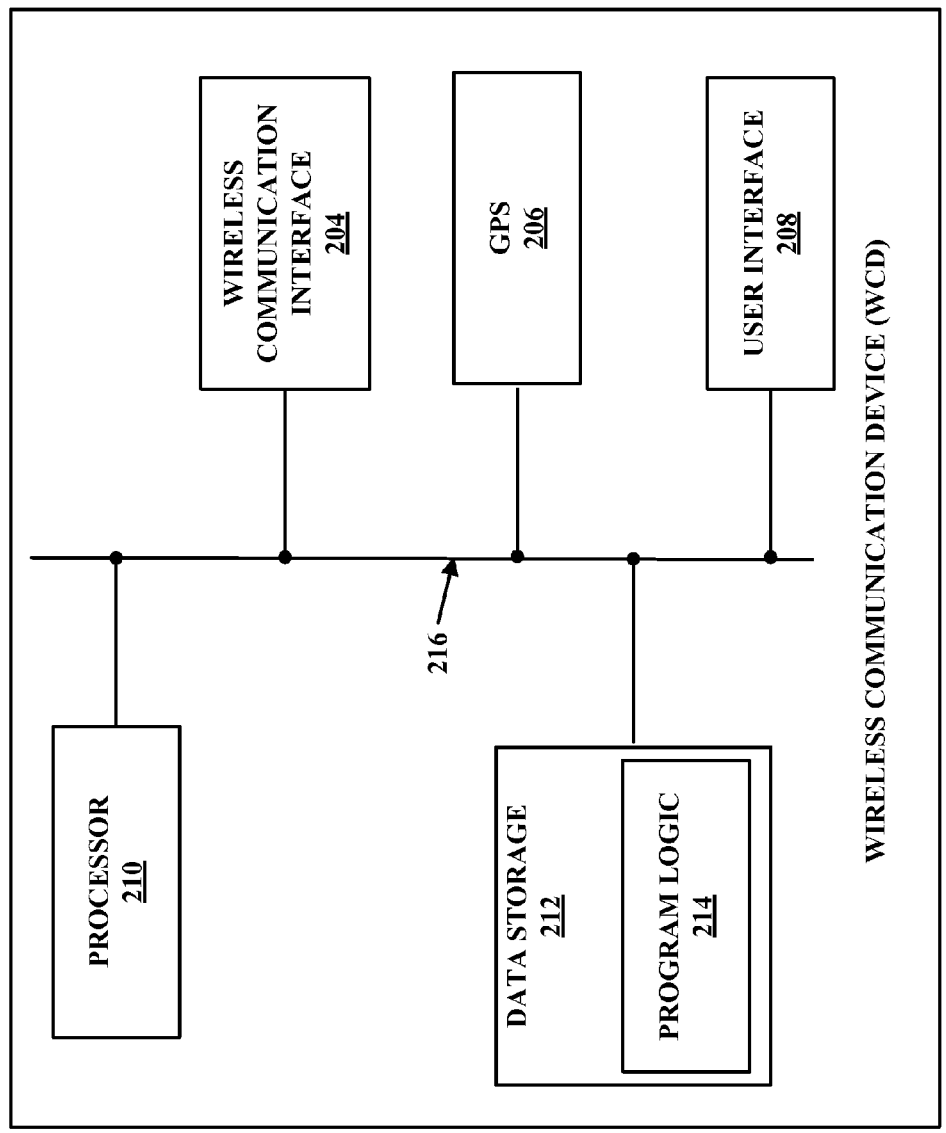
FIG. 2 is a simplified block diagram of an exemplary wireless communication device (WCD).

FIG. 2 is a simplified block diagram showing some of the functional components that can be included in a WCD, such as representative WCDs 101, 102, 103. A WCD may be any device arranged to carry out WCD functions described herein. For example, a WCD may comprise a cell phone, a PDA, a computer, a laptop computer, and/or a multi-mode device. The exemplary WCD shown in FIG. 2 comprises a wireless communication interface 204, a GPS receiver 206, a user interface 208, a processor 210, and data storage 212, all communicatively linked such as by a system bus, network, or other connection mechanism 216.

Wireless communication interface 204 functions to facilitate wireless communication with one or more BTSs, such as representative BTS 118, and/or one or more femtocells, such as representative femtocell 104. In CDMA, for instance, wireless communication interface 204 may include a transceiver having a rake receiver (not shown) of a type well known in the art, which enables the WCD to tune to particular PN offsets, so as to facilitate scanning various sectors, and so forth. An exemplary wireless communication interface is an MSM series chipset manufactured by Qualcomm Inc., together with one or more internal or external antennas.

In addition, wireless communication interface 204 may also function to facilitate wireless communication with a vehicle's on-board system, such as representative on-board system 105. Thus, the WCD may be able to determine vehicle information such as drive status and/or speed. In addition, wireless communication interface 204 may function to facilitate wireless communication with a vehicle's GPS receiver, such as representative GPS receiver 106. Thus, the WCD may be able to determine, via GPS receiver 106, the location and/or speed of a vehicle, such as representative vehicle 108. Alternatively, these functions could be provided by other aspects of the WCD.

GPS receiver 206 functions to communicate with GPS satellites, so as to facilitate determination of the location of a WCD. For instance, the WCD may obtain satellite assistance data from a mobile location system (MLS) (not shown) and, in accordance with that data, may tune to various satellites and measure received satellite signals. With use of the assistance data, the WCD may then geometrically compute its own location based on the measured satellite signals. Alternatively, the WCD may provide the satellite signal measurements to the MLS, and the MLS may compute the WCDs location. Although GPS receiver 206 is shown separate from wireless communication interface 204, the GPS receiver function can be integrated together with the wireless communication interface function, on a single chipset for instance. By way of example, in CDMA, the chipset could be a Qualcomm CDMA chipset having "gpsOne" functionality.

User interface 208 comprises components for receiving input from a user of the WCD and providing output to a user of the WCD. For instance, user interface 208 may include a keypad, touch-sensitive screen, microphone, and camera for receiving user input, and a display screen and speaker for providing user output. Further, user interface 208 may include analog/digital conversion circuitry to facilitate conversion between analog user input/output and digital signals on which the WCD can operate.

Processor 210 comprises one or more general purpose processors (such as INTEL processors or the like) and/or one or more special purpose processors (such as digital signal processors or application specific integrated circuits). To the extent processor 210 includes more than one processor, the processors could work separately or in combination. In addition, the one or more processors may be integrated together with wireless communication interface 204 or other aspect of the WCD.

Data storage 212 comprises one or more volatile or non-volatile storage components, such as optical, magnetic, or organic storage, and data storage 212 can be integrated in whole or in part with processor 210. As shown, data storage 212 comprises program logic 214. In turn, program logic 214 may comprise machine language instructions or other logic executable or interpretable by processor 210 to carry out various WCD functions described herein.

c. Exemplary Femtocell

Figure 3:
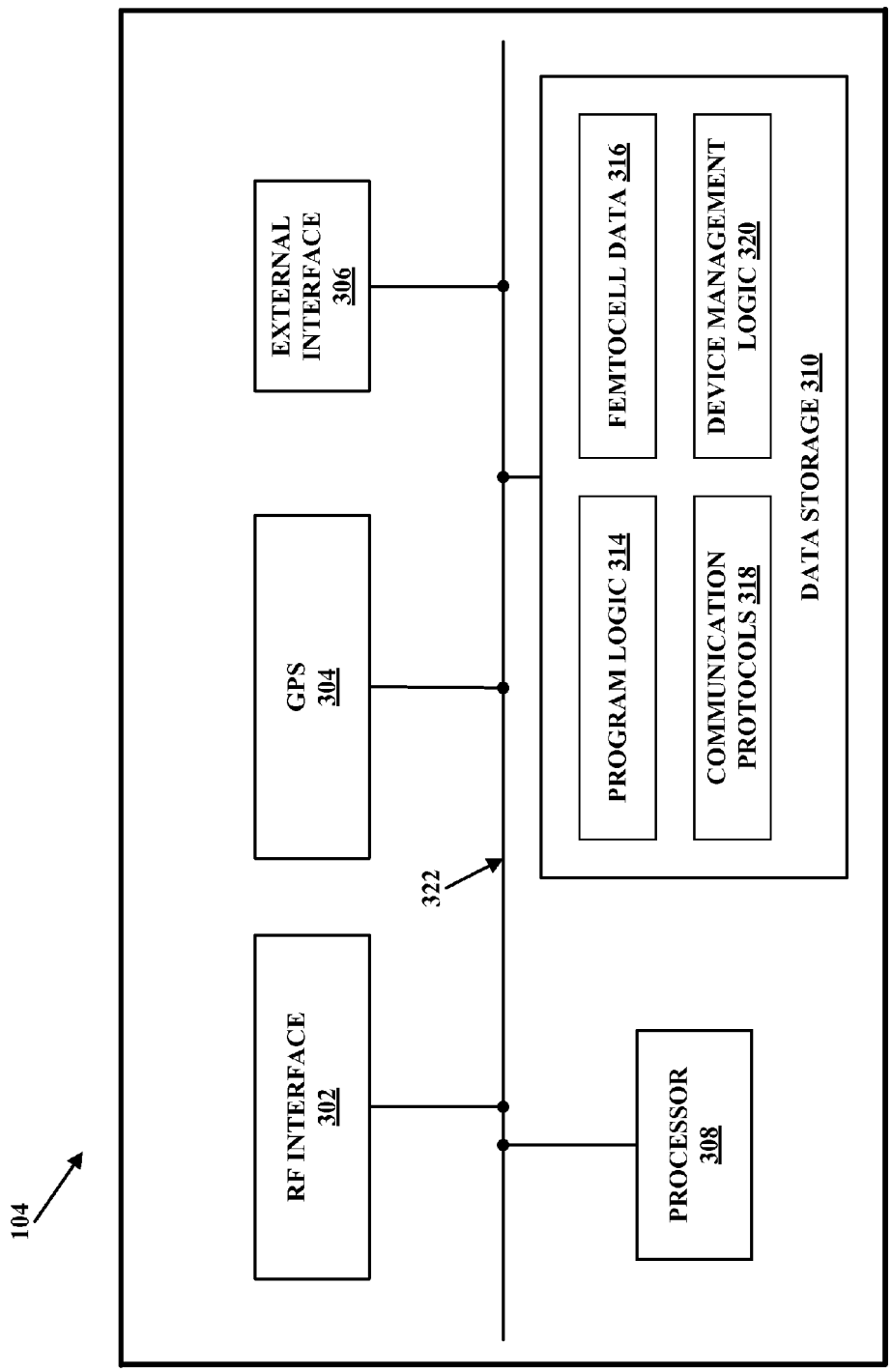
FIG. 3 is a simplified block diagram of an exemplary femtocell.

Femtocell 104 may be any device arranged to carry out femtocell functions described herein. FIG. 3 is a simplified block diagram showing some of the functional components that can be included in femtocell 104 in accordance with an exemplary embodiment. The exemplary femtocell 104 shown in FIG. 3 comprises an RF interface 302, a GPS receiver 304, an external interface 306, a processor 308, and data storage 310, all communicatively linked such as by a system bus, network, or other connection mechanism 322. Note that other embodiments of femtocell 104 may comprise additional and/or different components than those set forth in FIG. 3.

RF interface 302 functions to provide WCDs within the coverage area of femtocell 104 with wireless communication service according to one or more protocols such as those noted above. For example, RF interface 302 may provide wireless communication service according to CDMA. Accordingly, RF interface 302 may comprise one or more antennas, one or more chipsets, a set of one or more channel elements, and/or one or more other components. Femtocell 104 may provide a WCD, such as representative WCD 102, with wireless communication service, perhaps on a carrier different from the carriers being used by the macro network.

GPS receiver 304 functions to communicate with GPS satellites, so as to facilitate determination of the location of femtocell 104. For instance, femtocell 104 may obtain satellite assistance data from a mobile location system (MLS) and, in accordance with that data, may tune to various satellites and measure received satellite signals. With use of the assistance data, femtocell 304 may then geometrically compute its own location based on the measured satellite signals or may interact with the MLS to facilitate location determination.

External interface 306 functions to facilitate wireless communication with one or more network devices. External interface 306 may be a wireless interface for communication with one or more BTSs, such as representative BTS 118. In CDMA, external interface 306 may include a transceiver having a rake receiver (not shown) of a type well known in the art, which enables femtocell 104 to tune to particular PN offsets, so as to facilitate scanning various sectors, and so forth. Alternatively, or additionally, external interface 306 may comprise a wired interface for communicating with a device, such as a cellular modem, that in turn, is capable of wireless communication with BTS 118.

Once a communication link is established between femtocell 104 and BTS 118, femtocell 104 may be provided with packet data connectivity, via BSC 120 and PDSN 124, so as to communicate, via VPN-T 32, with femtocell controller 128 and to provide a communication data path, via MG 126, to PSTN 114. Thus, WCDs 101, 102 served by femtocell 104 can communicate with remote entities on PSTN 114. Additionally, WCDs 101, 102 served by femtocell 104 can communicate, via BSC 120 and PDSN 124, with remote entities on packet-switched network 112. Of course the type of communication in which a given WCD can engage will depend on the WCD's individual capabilities, as well as the network arrangement and capabilities.

External interface 306 may also comprise a wired and/or wireless interface for communicating with a vehicle's on-board system, such as representative on-board system 105, which is located in vehicle 108. Accordingly, femtocell 104 may be able to determine information regarding vehicle 108, such as drive status and/or speed. In addition, external interface 306 may comprise a wired and/or wireless interface for communicating with a GPS receiver, such as representative GPS receiver 106, which is located in vehicle 108. Accordingly, femtocell 104 may be able to determine the location and/or speed of vehicle 108.

Processor 308 may comprise one or more general purpose processors (such as INTEL processors or the like) and/or one or more special purpose processors (such as digital signal processors or application specific integrated circuits). To the extent processor 308 includes more than one processor, the processors could work separately or in combination. Data storage 310, in turn, comprises one or more volatile or non-volatile storage components, such as optical, magnetic, or organic storage, and data storage 310 can be integrated in whole or in part with processor 308.

As shown, data storage 310 comprises (a) program logic 314, (b) femtocell data 316, (c) communication protocols 318, and (d) device management logic 320. Program logic 314 may be executable by processor 308 to carry out various femtocell functions described herein. Femtocell data 316 may be any operational data or another type of data stored for use by femtocell 104. Communication protocols 318 may facilitate and enable communication with one or more other devices. Device management logic 320 may be used for memory and file management.

d. Exemplary Network Server

Figure 4:
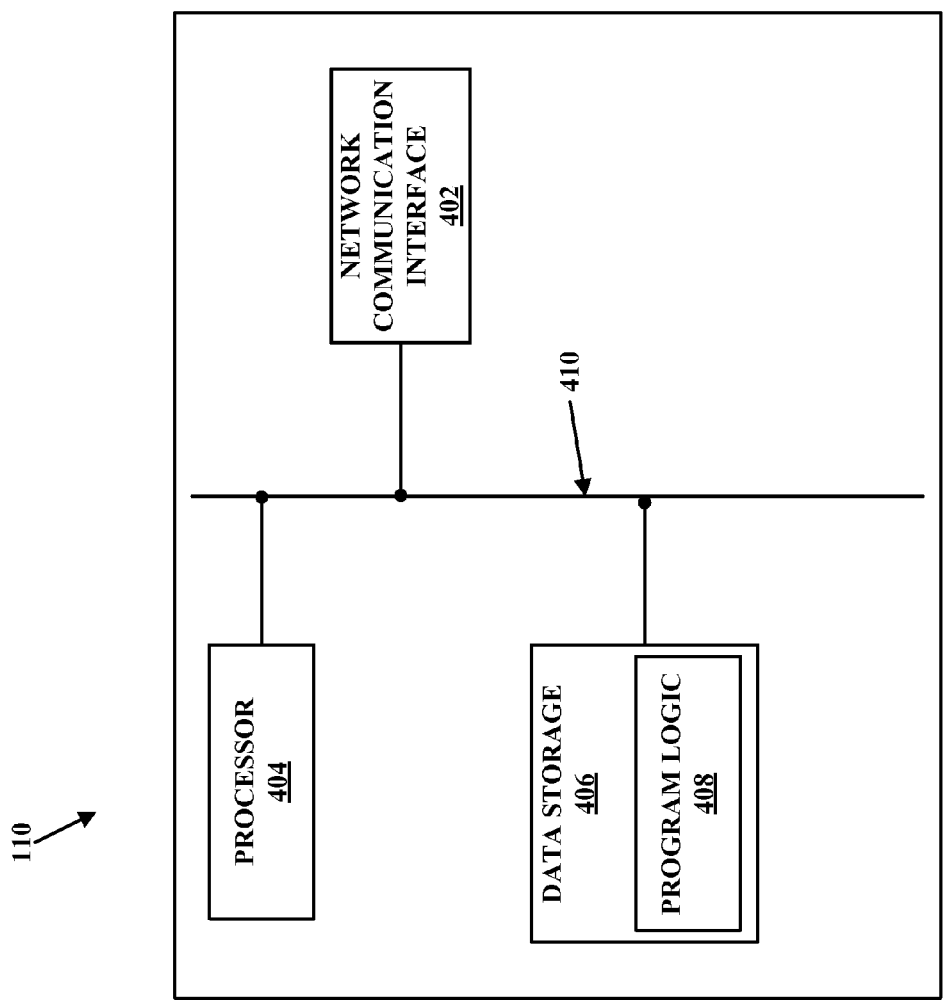
FIG. 4 is a simplified block diagram of an exemplary network server.

FIG. 4 is a simplified block diagram showing some of the functional components that can be included in network server 110 in accordance with an exemplary embodiment. Network server 110 may be any device arranged to carry out network server functions described herein. As shown in FIG. 4, network server 110 comprises a network communication interface 402, a processor 404, and data storage 406, all communicatively linked such as by a system bus, network, or other connection mechanism 410.

Network communication interface 402 functions to provide communication between network server 110 and other network devices and/or networks such as packet-switched network 112. Thus, network server 110 can communicate femtocell 104 and with WCDs served by femtocell 104, such as WCD 102, and may limit operation of WCD 102.

Processor 404 may comprise one or more general purpose processors (such as INTEL processors or the like) and/or one or more special purpose processors (such as digital signal processors or application specific integrated circuits). To the extent processor 404 includes more than one processor, the processors could work separately or in combination. Data storage 406, in turn, comprises program logic 408 executable by the one or more processors 404 to carry out various network server functions described herein.

2. Exemplary Operation a. Network Server Implementation

Figure 5:
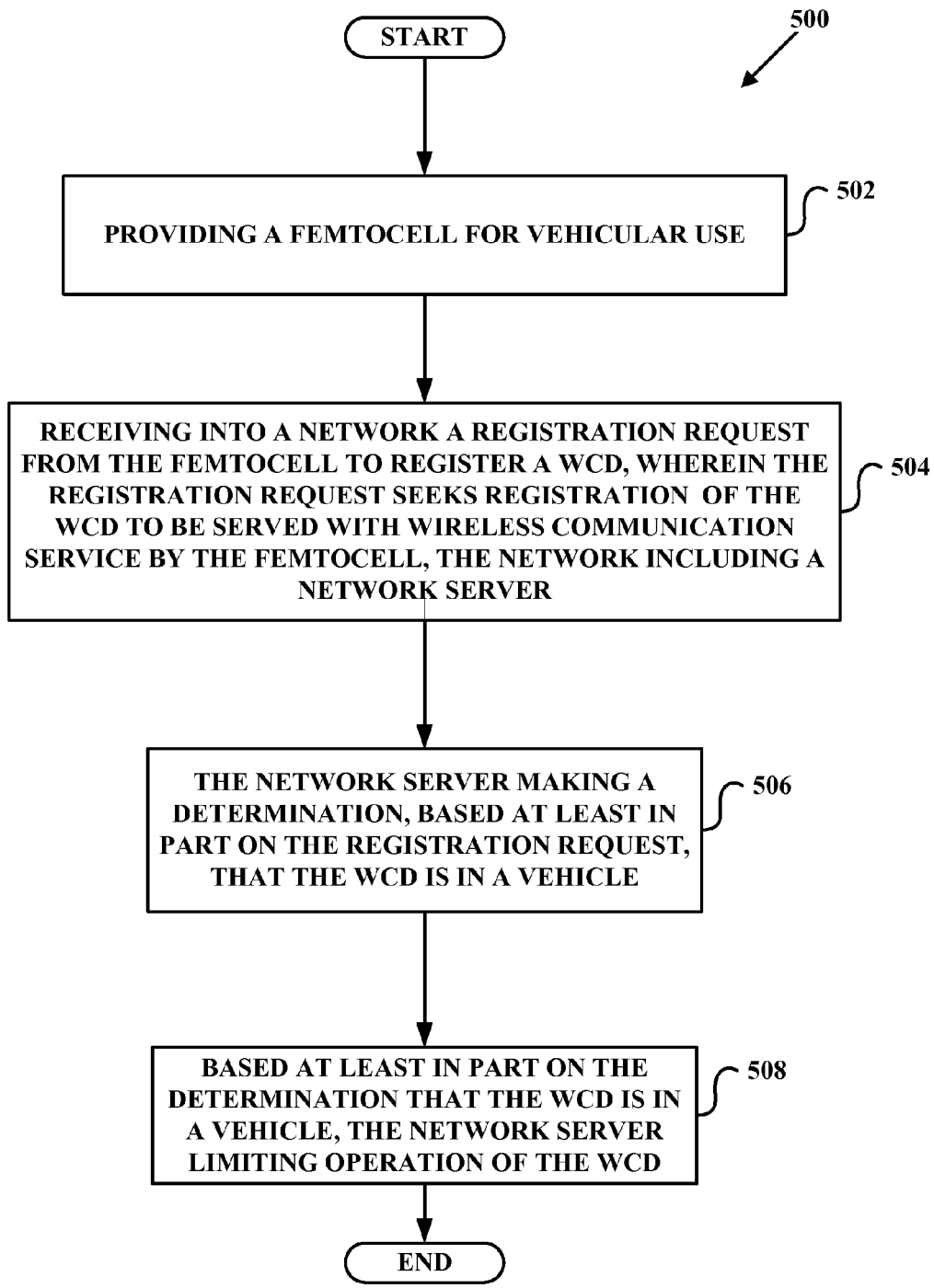
FIG. 5 is a flowchart of an exemplary method.

FIG. 5 is a generalized flowchart depicting functions that can be carried out in the arrangement of FIG. 1, in accordance with an exemplary method. In particular, FIG. 5 shows a method 500 for using an in-vehicle femtocell to limit operation of a WCD in a vehicle, where the method is carried out primarily by a network server.

As shown in FIG. 5, at step 502, a femtocell is provided for vehicular use. At step 504, a registration request is received into a network from the femtocell to register a WCD, where the registration request seeks registration of the WCD to be served with wireless communication service by the femtocell, the network including a network server. At step 506, the network server makes a determination, based at least in part on the registration request, that the WCD is in a vehicle. And at step 508, the network server limits operation of the WCD based at least in part on the determination that the WCD is in a vehicle.

i. Providing a Femtocell for Vehicular Use

At step 502, a femtocell 104 is provided for vehicular use. The femtocell 104 may be sold, rented, or leased as a "femtocell," "presence detector," or any other name that the provider deems appropriate. Such a provider may be a wireless service provider. In one example, a wireless service provider may sell, rent, or lease the femtocell 104 to its customer(s) for vehicular use. The wireless service provider may install the femtocell 104 or may allow its customer(s) to install the femtocell 104. In another example, the femtocell 104 may be provided to a vehicle manufacturer or dealer who may install the femtocell 104.

ii. Receiving into a Network a Registration Request from the Femtocell to Register a WCD At step 504, a network, such as representative network WSPN 116, including a network server 110, receives a registration request from the femtocell 104 to register a WCD 102, where the registration request seeks registration of the WCD 102 to be served with wireless communication service by the femtocell 104. In operation, the WCD 102 may transmit a registration request to the femtocell 104, which in turn, may transmit the registration request, in either original or modified form, to the WSPN 116.

Whether in original or modified form, the registration request received by the WSPN 116 may include an identifier that uniquely identifies the WCD 102. For example, the identifier may be a MIN or an ESN associated with the WCD 102. Of course, other identifiers may also be used. For example, the registration may include a userID identifying a user associated with the WCD 102.

The registration request received by WSPN 116 may also include an identifier that uniquely identifies the femtocell 104 from which the registration request is received. For example, the identifier may be an address or identification number associated with the femtocell 104. Additionally or alternatively, the identifier may identify the femtocell 104 as an in-vehicle femtocell. For example, the identifier may include data such as a bit, a text, or a flag, which indicates that the femtocell 104 is an in-vehicle femtocell.

The registration request may be transmitted to, and subsequently received by, the WSPN 116 at any time. For example, the femtocell 104 may transmit the registration request to the WSPN 116 after initially receiving the registration request from the WCD 102. In another example, the femtocell 104 may transmit or re-transmit the registration request to the WSPN 116 after the passage of a threshold amount of time after initially receiving the registration request from the WCD 102.

The request of the WCD 102 to be served with wireless communication service by the femtocell 104 may or may not be successful. If the request is successful then the network server 110 may send a registration response message to the femtocell 104 that authorizes the femtocell 104 to serve the WCD 102 with wireless communication service on the femtocell's carrier. If the request is unsuccessful then the network server 110 may send a registration response message to the femtocell 104 that directs the femtocell 104 not to serve the WCD 102.

iii. The Network Server Making a Determination that the WCD is in a Vehicle

At step 506, the network server 110 makes a determination, based at least in part on the registration request, that the WCD 102 is in a vehicle 108.

The network server 110 may determine that the WCD 102 is in a vehicle in various ways. For example, the network server 110 may determine that the WCD 102 is in a vehicle 108 based on the registration request. As mentioned above, the registration request may include an identifier that includes data such as a bit, a text, or a flag, which indicates that the femtocell 104 as an in-vehicle femtocell. Thus, the network server 110 may determine that the WCD 102 is in a vehicle 108 based on the fact that the WCD 102 seeks registration to be served with wireless communication service by an in-vehicle femtocell.

Where the registration request includes an address or identification number associated with the femtocell 104, the network server 110 may need to look up the address or identification number to determine that the femtocell 104 is an in-vehicle femtocell, and thus that the WCD 102 is in a vehicle 108 because it seeks registration to be served with wireless communication service by an in-vehicle femtocell. Data comprising the address or identification number, as well as the type of femtocell (e.g., in-vehicle femtocell) associated with the address or identification number, may be stored anywhere on the WSPN 116 including in the data storage 406 of the network server 110. Thus, the network server 110 may determine that the WCD 102 is in a vehicle 108 by looking up this data in an entity on the WSPN 116 or by accessing its own data storage 406.

iv. The Network Server Limiting Operation of the WCD

At step 510, based at least in part on the determination that the WCD 102 is in a vehicle 108, the network server 110 limits operation of the WCD 102. Operation of the WCD 102 may be limited while the WCD 102 is served by the femtocell 104.

Limiting operation of the WCD 102 may comprise limiting various WCD functions. In one example for instance, limiting operation of the WCD 102 may comprise blocking voice communications whenever the WCD 102 is not in a hands-free mode. In another example, limiting operation of the WCD 102 may comprise blocking text messaging to and from the WCD. Other functions may be limited as well. Furthermore, multiple WCD functions may be limited concurrently.

A service directive, such as a directive to limit (or block) the requested communication or to modify the communication in some way, may be used to facilitate limiting operation of the WCD 102. For example, the network server 110 may send a service directive to the femtocell 104 that directs the femtocell 104 to limit operation (e.g., block text messaging functions) of the WCD 102. In response to receiving the service directive, the femtocell 104 may block text messaging by prohibiting text messages to or from the WCD 102. In another example, the network server 110 may send a service directive to the WCD 102 that directs the WCD 102 to limit operation (e.g., block text messaging) of the WCD 102. In response to receiving the service directive, the WCD 102 may disable its text-message-sending function and or its text-message-receiving function. A service directive may be sent in any message and at any time. For example, a service directive may be sent in a message responding to the registration request.

The network server 110 may impose a limitation on operation of the WCD 102 in response to (i.e., based on) the network server 110 determining that one or more conditions are met. For example, the network server 110 may limit operation of the WCD 102 in response to determining that the WCD 102 is in a vehicle 108, as recited in step 508. However, the network server 110 may require one or more additional conditions to be met before the network server 110 limits operation of the WCD 102.

In one example, the network server 110 may limit operation of the WCD 102 in response to determining that the vehicle 108 is traveling at a given speed. As noted above, the femtocell 104 may comprise a GPS receiver 304, and an external interface 306 for communicating with the vehicle's on-board system 105 and/or the vehicle's GPS receiver 106. Thus, the femtocell 104 may determine the speed of the vehicle 108. The femtocell may then communicate the speed of the vehicle to the network server 110, thus, allowing the network server 110 to determine, via communication with the femtocell 104, the speed of the vehicle 108. The femtocell 104 may communicate the speed of the vehicle 108 to the network server in any message and at any time. For instance, the femtocell 104 may include data representing the speed of the vehicle in a message that is transmitted to the network server 110 after the passage of a threshold amount of time after initially receiving the registration request from the WCD 102. The message may be a re-transmitted registration request that has been modified to include data representing the speed of the vehicle 108. Alternatively, the message may comprise nothing more than data representing the speed of the vehicle 108.

In another example, the network server 110 may limit operation of the WCD 102 in response to determining that the vehicle 108 has a given drive status (e.g., moving, in reverse, in drive, etc.). Similar to determining the speed of the vehicle 108, the network server 110 may determine, via communication with the femtocell 104, the drive status of the vehicle 108. Therefore, if the network server 110 determines that the vehicle 108 has a given drive status, such as the vehicle 108 is moving, the network server 110 may limit operation of the WCD 102.

In another example, the network server 110 may limit operation of the WCD 102 in response to determining that a user associated with the WCD 102 has a particular user profile. For instance, the network server 110 may limit operation of the WCD 102 in response to determining that the user is over a certain age, such as age 16. Further, the user profile may comprise information regarding when the network server 110 should limit operation of the WCD 102, such as by defining conditions that must be met before the network server 110 limits operation of the WCD 102. For instance, the profile may indicate that operation of the WCD 102 should be limited if a particular other WCD, such representative WCD 101, is in the vehicle 108. Additionally or alternatively, the profile may indicate that operation of the WCD 102 should be limited in the event that the vehicle 108 exceeds a particular threshold speed.

An account record for the WCD 102 may include user profile information about the user associated with the WCD 102. This information may be stored in various entities in the system 100 such that the network server 110 may have access to the information, perhaps by querying the entity. For instance, user profile information may be stored in the WCD 102, in the femtocell 104, in the HLR 134, and/or in the network server 110. The WCD 102, may store in its data storage 212, user profile information of a user associated with the WCD 102. The user profile information may then be transmitted, perhaps with the registration request, to the network server 110. However, the information need not be transmitted to the network server 110. For instance, the network server 110 may look up the information in its data storage 406 or in the HLR 134.

In another example, the network server 110 may limit operation of the WCD 102 in response to determining that one or more other WCDs are in the vehicle 108. The network server 110 may determine whether one or more other WCDs are in the vehicle 108 in various ways. For example, the network server 110 may determine whether one or more other WCDs are in the vehicle 108 based on whether the network server 110 received one or more other registration requests from the femtocell 104, where the one or more other registration requests sought registration of one or more other WCDs. An example of when the presence of other WCDs in the vehicle 108 might be used as a basis to limit operation of the WCD 102 is if a WCD associated with a child (or, more generally, a person of a particular age) is determined to be in the vehicle 108, then operation of the WCD 102, which may be associated with an adult, may be limited because it is likely that the adult would be driving under such circumstances.

v. Adjusting a Limitation of at Least One Other WCD in the Vehicle

In addition to limiting operation of the WCD 102, the method 500 may further comprise a step (not shown) where the network server 110 may adjust a limitation of at least one other WCD in the vehicle 108 based at least in part on the determination that the WCD 102 is the vehicle 108.

An example of when the presence of the WCD 102 in the vehicle may be used as a basis to adjust a limitation of at least one other WCD in the vehicle 108 is in circumstances similar to those presented above where the WCD associated with the child is in the vehicle 108. If operation of the WCD associated with the child is limited at the time the WCD 102, which may be associated with an adult, is determined to be in the vehicle, the network server 110 may adjust (e.g., remove or modify) this limitation in response to determining that the WCD 102 is in the vehicle, because it is likely that the child would not be driving under such circumstances.

vi. Limiting Operation of at Least One Other WCD in the Vehicle

Method 500 may further comprise a step (not shown) where the network server 110 may limit operation of at least one other WCD in the vehicle 108 based at least in part on a determination that the WCD 102 is no longer in the vehicle 108.

The network server 110 may determine that the WCD 102 is no longer in the vehicle 108 in various ways. For instance, the network server 110 may query the femtocell 104 as to whether the WCD 102 is registered with the femtocell 104. Additionally or alternatively, an entity on the WSPN 116, such as the HLR 134, may keep a record of the WCDs that are currently registered with the femtocell 104. Thus, the network server 110 may query the HLR 134 and determine that the WCD 102 is no longer in the vehicle 108.

An example of when the absence of the WCD 102 in the vehicle may be used as a basis to limit operation of at least one other WCD in the vehicle 108 is in circumstances where an adult (associated with the WCD 102) and a child (associated with another WCD) are in a vehicle 108. Under such circumstances it is likely that the adult would be driving and therefore operation of the WCD 102 may be limited as discussed above. Now consider that the adult (and associated WCD 102) exits the vehicle but the child (and associated WCD) remains in the vehicle. In response to a determination that the WCD 102 is no longer in the vehicle, the network server 110 may limit operation of the WCD associated with the child because it is likely that the child (the only person in the vehicle) would be driving.

b. Femtocell Implementation

Figure 6:
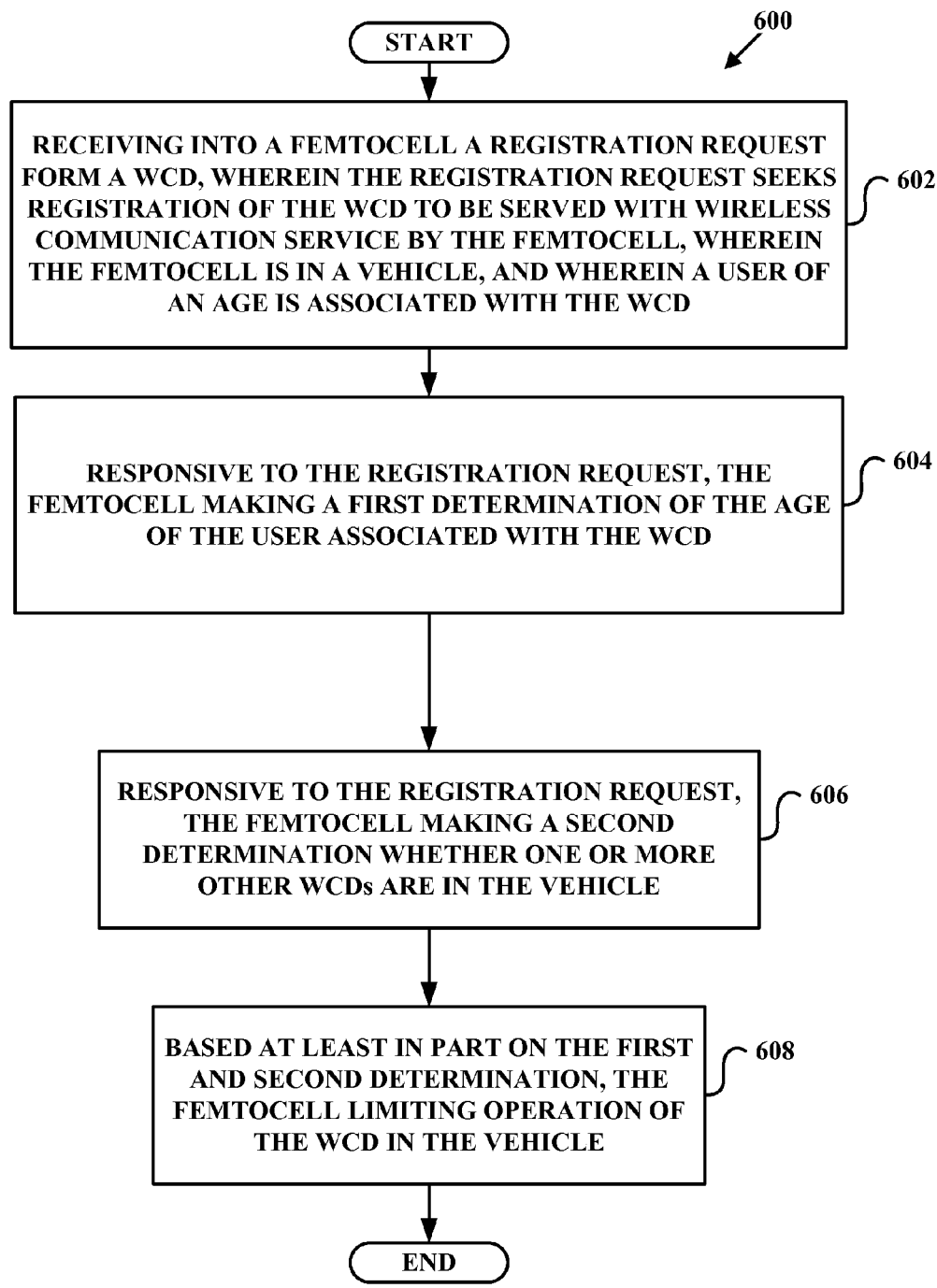
FIG. 6 is a flowchart of an exemplary method.

FIG. 6 is a generalized flowchart depicting functions that can be carried out in the arrangement of FIG. 1, in accordance with an exemplary method. In particular, FIG. 6 shows a method 600 for using an in-vehicle femtocell to limit operation of a WCD in a vehicle, where the method is carried out primarily by the femtocell.

As shown in FIG. 6, at step 602, a femtocell receives a registration request from a WCD, where the registration request seeks registration of the WCD to be served with wireless communication service by the femtocell, where the femtocell is in a vehicle (an "in-vehicle femtocell"), and where a user of a particular age is associated with the WCD. At step 604, in response to the registration request, the femtocell makes a first determination of the age of the user associated with the WCD. At step 606, in response to the registration request, the femtocell makes a second determination whether one or more other WCDs are in the vehicle. And at step 608, based at least in part on the first and second determinations, the femtocell limits operation of the WCD in the vehicle.

i. Receiving into an in-Vehicle Femtocell a Registration Request from a WCD, where a User of an Age is Associated with the WCD At step 602, an in-vehicle femtocell 104 receives a registration request from a WCD 102, where the registration request seeks registration of the WCD 102 to be served with wireless communication service by the femtocell 104, and where a user of a particular age is associated with the WCD 102. The registration request received by the femtocell 104 may include an identifier that uniquely identifies the WCD 102, examples of which include those noted above.

The registration request may be transmitted to, and subsequently received by, the femtocell 104 at any time. For example, the WCD 102 may transmit the registration request to the femtocell 104 after or while operating on a wireless service provider's macro network, such as WSPN 116, and/or perhaps after the WCD 102 is initially powered on. In either case, the femtocell 104 may receive a registration request from a WCD 102 perhaps in response to the femtocell 104 sending a pilot signal that alerts the WCD 102 that it is within the coverage area of the femtocell 104. In response to receiving (or detecting) the pilot signal, the WCD 102 may transmit the registration request immediately and/or upon the passage of a threshold amount of time.

The request of the WCD 102 to be served with wireless communication service by the femtocell 104 may or may not be successful. If the request is successful then the femtocell 104 may begin serving the WCD 102 with wireless communication service on the femtocell's carrier. If the request is unsuccessful then the femtocell 104 may send a message to the WCD 102 indicating that registration is denied. Thus, the WCD 102 may not be served by the femtocell 104.

ii. The Femtocell Making a First Determination of the Age of the User Associated with the WCD At step 604, responsive to the registration request, the femtocell 104 makes a first determination of the age of the user associated with the WCD 102.

An account record for the WCD 102 may include user profile information (e.g., age) about the user associated with the WCD 102. This information may be stored in various entities in the system 100, examples of which include those noted above. In one example, the WCD 102 may store in its data storage 212, user profile information including the age of a user associated with the WCD 102. The age of the user may then be transmitted, perhaps with the registration request, to the femtocell 104. Thus, the femtocell 104 may determine the age of the user associated with the WCD 102. However, in another example, the age of the user need not be transmitted to the femtocell 104. For instance, the femtocell 104 may look up the age of the user in its data storage 406 or may query HLR 134 or another network entity to determine the user's age.

iii. The Femtocell Making a Second Determination of whether One or More Other WCDs are in the Vehicle At step 606, responsive to the registration request, the femtocell 104 makes a second determination whether one or more other WCDs, such as representative WCD 101, are in the vehicle 108.

In one example, the femtocell 104 may determine whether one or more other WCDs are in the vehicle 108 by broadcasting a signal, such as a pilot signal, and receiving, in response to broadcasting the signal, one or more registration requests from one or more WCDs in the vehicle 108. In another example, the femtocell 104 may determine whether one or more other WCDs are in the vehicle 108 based on whether the one or more other WCDs are already registered with the femtocell 104.

iv. The Femtocell Limiting Operation of the WCD in the Vehicle

At step 608, based at least in part on the first and second determinations, the femtocell 104 limits operation of the WCD 102 in the vehicle 108. Operation of the WCD 102 may be limited while the WCD 102 is served by the femtocell 104.

As mentioned with respect to method 500, limiting the operation of the WCD 102 may comprise limiting various WCD functions, examples of which include those noted above.

The femtocell 104 may limit operation (e.g., block text messaging functions) of the WCD 102 by prohibiting text messages to or from the WCD 102. Additionally or alternatively, a service directive, such as a directive to limit (or block) the requested communication or to modify the communication in some way, may be used to facilitate limiting operation of the WCD 102. For instance, the femtocell 104 may send a service directive to the WCD 102 that directs the WCD 102 to limit operation (e.g., block text messaging) of the WCD 102. In response to receiving the service directive, the WCD 102 may disable its text-message-sending function and or its text-message-receiving function. A service directive may be sent in any message and at any time. For example, a service directive may be sent in a message responding to the registration request.

The femtocell 104 may also impose a limitation on operation of the WCD 102 in response to (i.e., based on) the femtocell 104 determining that one or more conditions are met. For example, the femtocell 104 may limit operation of the WCD 102 in response to determining that the WCD 102 is in the vehicle or in response to determining (i) that the user associated with the WCD 102 is over a certain age and (ii) that one or more other WCDs are in the vehicle 108, as recited in step 608. However, the femtocell 104 may require one or more additional conditions to be met before the femtocell 104 limits operation of the WCD 102

In one example, the femtocell 104 may limit operation of the WCD 102 in response to determining that the vehicle 108 is traveling at a given speed. As noted above, the femtocell 104 may comprise a GPS receiver 304, and an external interface 306 for communicating with the vehicle's on-board system 105 and/or the vehicle's GPS receiver 106. Thus, the femtocell 104 may determine and/or have access to the speed of the vehicle 108.

In another example, the femtocell 104 may limit operation of the WCD 102 in response to determining that the vehicle 108 has a given drive status (e.g., moving, in reverse, in drive, etc.). Similar to determining the speed of the vehicle 108, the femtocell may determine, via its GPS receiver 304 and/or its external interface 306, the drive status of the vehicle 108. Therefore, if the femtocell 104 determines that the vehicle 108 has a given drive status, such as the vehicle 108 is moving, the femtocell 104 may limit operation of the WCD 102.

In another example, the femtocell 104 may limit operation of the WCD 102 in response to determining that a user associated with the WCD 102 has a particular user profile in addition to the age of the user. For instance, the user profile may comprise information regarding when the femtocell 104 should limit operation of the WCD 102, such as by defining conditions that must be met before the femtocell 104 limits operation of the WCD 102. The profile may indicate that operation of the WCD 102 should be limited if a particular other WCD, such representative WCD 101, is in the vehicle 108. Additionally or alternatively, the profile may indicate that operation of the WCD 102 should be limited in the event that the vehicle 108 exceeds a threshold speed.

An account record for the WCD 102 may include user profile information about the user associated with the WCD 102. This information may be stored in various entities in the system 100 such that the femtocell 104 may have access to the information, examples of which include those noted above.

v. Adjusting a Limitation of at Least One Other WCD in the Vehicle

In addition to limiting operation of the WCD 102, the method 600 may further comprise a step (not shown) where the femtocell 104 may adjust (e.g., remove or modify) a limitation of at least one other WCD in the vehicle 108 based at least in part on the determination that the WCD 102 is in the vehicle 108.

vi. Limiting Operation of at Least One Other WCD in the Vehicle

Method 600 may further comprise a step (not shown) where the femtocell 104 may limit operation of at least one other WCD in the vehicle 108 based at least in part on a determination that the WCD 102 is no longer in the vehicle 108. The femtocell 104 may determine that the WCD 102 is no longer in the vehicle 102 in various ways analogous to those noted above. For instance, the femtocell 104 may query the HLR 134 to determine which WCDs are currently registered with the femtocell 104. Additionally or alternatively, the femtocell 104 may keep its own record of which WCDs are registered with itself.

c. WCD Implementation

Figure 7:
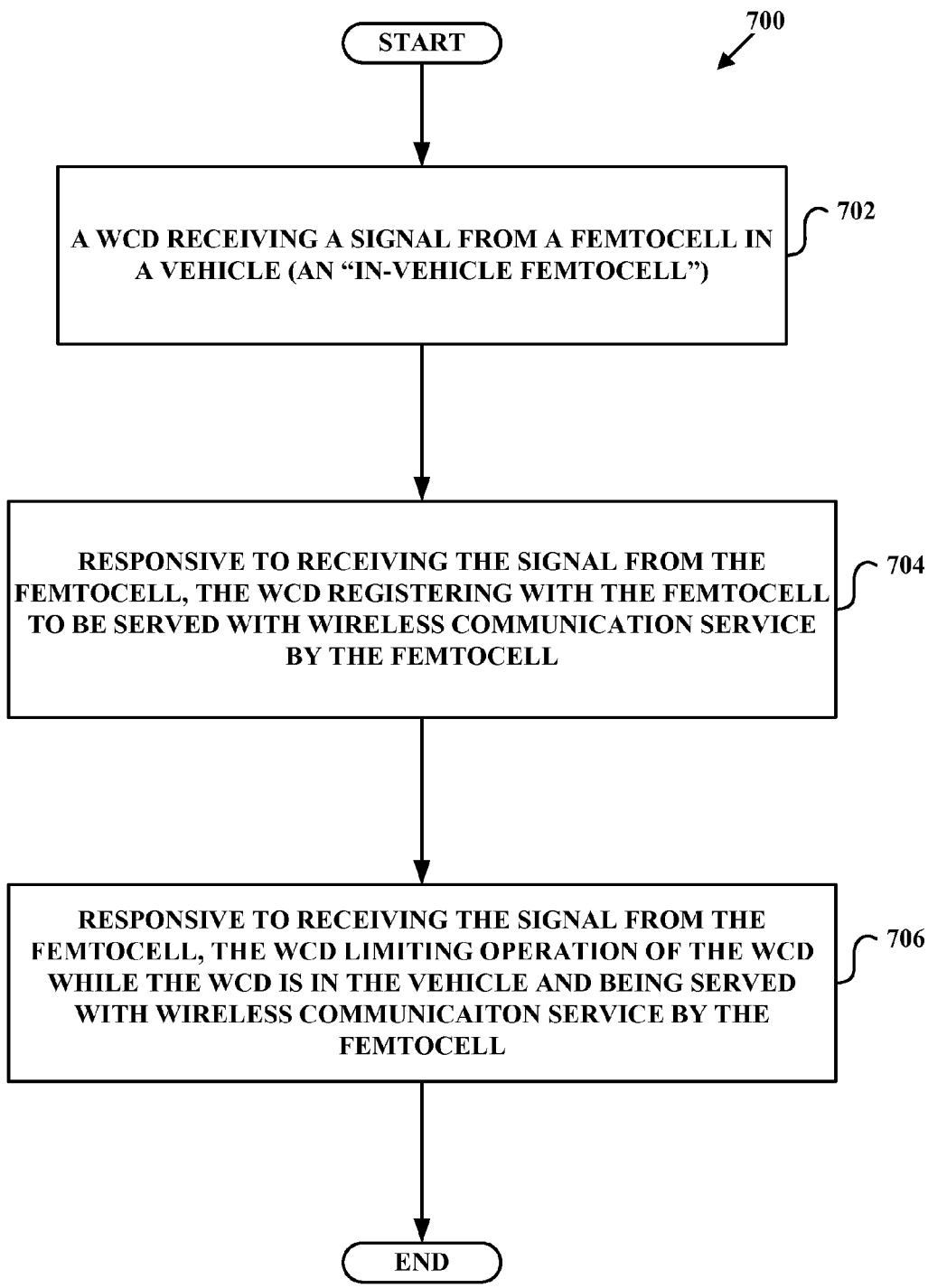
FIG. 7 is a flowchart of an exemplary method.

FIG. 7 is a generalized flowchart depicting functions that can be carried out in the arrangement of FIG. 1, in accordance with an exemplary method. In particular, FIG. 7 shows a method 700 for using an in-vehicle femtocell to limit operation of a WCD in a vehicle, where the method is carried out primarily by the WCD.

As shown in FIG. 7, at step 702 a WCD receives a signal from a femtocell in a vehicle (an "in-vehicle femtocell"). At step 704, in response to receiving the signal from the femtocell, the WCD registers with the femtocell to be served with wireless communication service by the femtocell. And, at step 706, in response to receiving the signal from the femtocell, the WCD limits operation of the WCD while the WCD is in the vehicle and being served with wireless communication service by the femtocell.

i. A WCD Receiving a Signal from an "in-Vehicle Femtocell"

At step 702, a WCD 102 receives a signal from a femtocell 104 in a vehicle 108 (an "in-vehicle femtocell"). The signal may alert the WCD 102 that it is within the coverage area of the femtocell 104. For example, the signal may be a pilot signal.

The pilot signal may be received while the WCD 102 is operating on a wireless service provider's macro network, such as WSPN 116, and/or perhaps after the WCD 102 is initially powered on. The pilot signal may include data such as a bit, a text, or a flag, indicating that the pilot signal is associated with an in-vehicle femtocell 104. The pilot signal may also include messages and parameters that the WCD 102 may use to initially connect with the femtocell 104 or to facilitate handoff from a macro-network carrier to the femtocell's 104 carrier, among other possibilities. The messages and parameters may inform the WCD 102 of the femtocell's carrier, and the WCD 102 may subsequently transmit a registration request to the femtocell 104 on that carrier.

ii. In Response to the WCD Receiving the Signal, the WCD (i) Registering with the Femtocell and (ii) Limiting Operation of the WCD At steps 704 and 706, responsive to receiving the signal from the femtocell 104, the WCD 102 (i) registers with the femtocell 104 to be served with wireless communication service by the femtocell 104 and (ii) limits operation of the WCD 102 while the WCD 102 is in the vehicle 108 and being served with wireless communication service by the femtocell 104.

As noted above, in order to register with the femtocell 104, the WCD 102 may send a registration request to the femtocell 104. The registration request may include an identifier that uniquely identifies the WCD 102, examples of which include those noted above.

In response to receiving the registration request from the WCD 102, the femtocell 104 may register the WCD 102 and may begin providing the WCD 102 with wireless communication service on the femtocell's carrier. Alternatively, registration may be unsuccessful and the femtocell 104 may send a registration response message to the WCD 102 indicating that registration is denied.

As mentioned with respect to methods 500 and 600, limiting the operation of the WCD 102 may comprise limiting various WCD functions, examples of which include those noted above. In one example, the WCD 102 may disable its text-message-sending function and or its text-message-receiving function.

The WCD 102 may impose a limitation on its own operation in response to (i.e., based on) the WCD 102 determining that one or more conditions are met. For example, the WCD 102 may limit its own operation in response to determining that the WCD 102 received a signal, such as a pilot signal, from the femtocell 104. However, the WCD 102 may require one or more additional conditions to be met before the WCD 102 limits its own operation.

In one example, the WCD 102 may limit its own operation in response to determining that the vehicle 108 is traveling at a given speed. As noted above, the WCD 102 may comprise a GPS receiver 206. Additionally, the femtocell 104 may comprise a GPS receiver 304, and an external interface 306 for communicating with the vehicle's on-board system 105 and/or the vehicle's GPS receiver 206. Thus, the WCD 102 may determine the speed of the vehicle 108, via its GPS receiver 206 and/or via communication with the femtocell 104.

In another example, the WCD 102 may limit its own operation in response to determining that the vehicle 108 has a given drive status (e.g., moving, in reverse, in drive, etc.). Similar to determining the speed of the vehicle 108, the WCD 102 may determine, via its GPS receiver 206 and/or via communication with the femtocell 104, the drive status of the vehicle 108. Therefore, if the WCD 102 determines that the vehicle 108 has a given drive status, such as the vehicle 108 is moving, the WCD 102 may limit its own operation.

In another example, the WCD 102 may limit its own operation in response to determining that a user associated with the WCD 102 has a particular user profile. For instance, the WCD 102 may limit its own operation in response to determining that the user is over a certain age, such as age 16. Further, the user profile may comprise information regarding when to limit operation of the WCD 102, such as by defining conditions that must be met before the WCD 102 limits its own operation. For instance, the profile may indicate that operation of the WCD 102 should be limited if a particular other WCD, such representative WCD 101, is in the vehicle 108. Additionally or alternatively, the profile may indicate that operation of the WCD 102 should be limited in the event that the vehicle 108 exceeds a threshold speed.

An account record for the WCD 102 may include user profile information about the user associated with the WCD 102. This information may be stored in various entities in the system 100 such that the WCD 102 may have access to the information, examples of which include those noted above. For instance, the WCD 102 may store in its data storage 212, user profile information of a user associated with the WCD 102. Additionally or alternatively, the femtocell 104 may store user profile information and the WCD 102 may query the femtocell 104 to determine whether the user associated with the WCD 102 has a particular user profile.

In another example, the WCD 102 may limit its own operation in response to determining that one or more other WCDs are in the vehicle 108. The WCD 102 may determine whether one or more other WCDs are in the vehicle 108 in various ways. For instance, the WCD 102 may determine whether one or more other WCDs are in the vehicle 108 by querying the femtocell 104 to determine whether the femtocell 104 received one or more other registration requests from one or more other WCDs. Additionally or alternatively, the WCD 102 may determine whether one or more other WCDs are in the vehicle 108 using a WCD-to-WCD wireless protocol such as Bluetooth.

3. Conclusion

Various exemplary embodiments have been described above. Those skilled in the art will understand, however, that changes and modifications may be made to those examples without departing from the scope of the claims.

What is claimed is:

1. A method comprising:
providing an in-vehicle femtocell for vehicular use;
receiving into a network a registration request from the in-vehicle femtocell to register a wireless communication device (WCD), wherein the registration request seeks registration of the WCD to be served with wireless communication service by the in-vehicle femtocell, the network including a network server;

the network server making a determination, based at least in part on the registration request being received from the in-vehicle femtocell, that the WCD is in a vehicle; and based at least in part on the determination that the WCD is in a vehicle, the network server limiting operation of the WCD while the WCD is served by the in-vehicle femtocell.

2. The method of claim 1, wherein limiting operation of the WCD comprises blocking voice communications if the WCD is not in a hands-free mode.

3. The method of claim 1, wherein limiting operation of the WCD comprises blocking text messaging.

4. The method of claim 1, wherein limiting operation of the WCD comprises limiting operation of the WCD by sending a service directive to the in-vehicle femtocell that directs the in-vehicle femtocell to limit operation of the WCD.

5. The method of claim 1, wherein limiting operation of the WCD comprises limiting operation of the WCD by sending a service directive to the WCD that directs the WCD to limit operation of the WCD.

6. The method of claim 1, wherein limiting operation of the WCD comprises limiting operation of the WCD based at least in part on a determination of whether one or more other WCDs are in the vehicle.

7. The method of claim 1, wherein the vehicle is traveling at a speed, and wherein limiting operation of the WCD comprises limiting operation of the WCD based at least in part on a determination of the speed of the vehicle.

8. The method of claim 7, wherein the speed of the vehicle is communicated to the network server by the in-vehicle femtocell.

9. The method of claim 1, wherein the vehicle has a drive status, and wherein limiting operation of the WCD comprises limiting operation of the WCD based at least in part on a determination of the drive status of the vehicle.

10. The method of claim 1, wherein a user of an age is associated with the WCD, and wherein limiting operation of the WCD comprises limiting operation of the WCD based at least in part on a determination of the age of the user associated with the WCD.

11. The method of claim 1, wherein a user having a user profile is associated with the WCD, and wherein limiting operation of the WCD comprises limiting operation of the WCD based at least in part on the user profile.

12. The method of claim 1, further comprising, based at least in part on the determination that the WCD is in a vehicle, the network server adjusting a limitation of at least one other WCD in the vehicle.

13. The method of claim 12, wherein adjusting a limitation comprises removing the limitation.

14. The method of claim 1, further comprising, based at least in part on a determination that the WCD is no longer in the vehicle, the network server limiting operation of at least one other WCD in the vehicle.

15. A network server comprising:

a network communication interface;

one or more processors;

data storage; and program logic executable by the one or more processors to carry out functions including: (i) receiving a registration request from an in-vehicle femtocell to register a wireless communication device (WCD), wherein the registration request seeks registration of the WCD to be served with wireless communication service by the in-vehicle femtocell, (ii) making a determination, based at least in part on the registration request being received from the in-vehicle femtocell, that the WCD is in a vehicle, and (iii) based at least in part on the determination that the WCD is in a vehicle, limiting operation of the WCD while the WCD is served by the in-vehicle femtocell.

\* \* \* \* \*